United States Patent [19]

Kim et al.

[11] 4,369,165

[45] Jan. 18, 1983

[54] RECOVERY OF TUNGSTEN VALUES FROM ALKALI TUNGSTATE SOLUTIONS BY SOLVENT EXTRACTION

[75] Inventors: Tai K. Kim; Martin B. MacInnis, both of Towanda; Martin C. Vogt; Robert P. McClintic, both of Monroeton, all of Pa.

[73] Assignee: GTE Products Corporation, Stamford, Conn.

[21] Appl. No.: 292,379

[22] Filed: Aug. 13, 1981

[51] Int. Cl.$^3$ ............................................. C01G 41/00
[52] U.S. Cl. .................................. 423/54; 75/101 BE
[58] Field of Search ........................... 423/54, 101 BE

[56] References Cited

U.S. PATENT DOCUMENTS 3,158,438  11/1964  Kurtak .................................. 423/54
3,293,004  12/1966  Musgrove et al. .................... 423/54
4,175,109  11/1979  Kim ...................................... 423/54

FOREIGN PATENT DOCUMENTS 1240524  7/1971  United Kingdom .................. 423/54

*Primary Examiner*—Herbert T. Carter
*Attorney, Agent, or Firm*—Robert E. Walter

[57] ABSTRACT

In a three component extraction system for producing ammonium tungstate from aqueous alkali metal tungstate from aqueous alkali metal tungstate solution, the stripping solution consists essentially of water and from about 5 to about 21 percent ammonium hydroxide at a pH of from about 12 to about 13 wherein the stripping is carried out by dispersing the aqueous ammonia solution in the loaded organic extractant.

2 Claims, 2 Drawing Figures

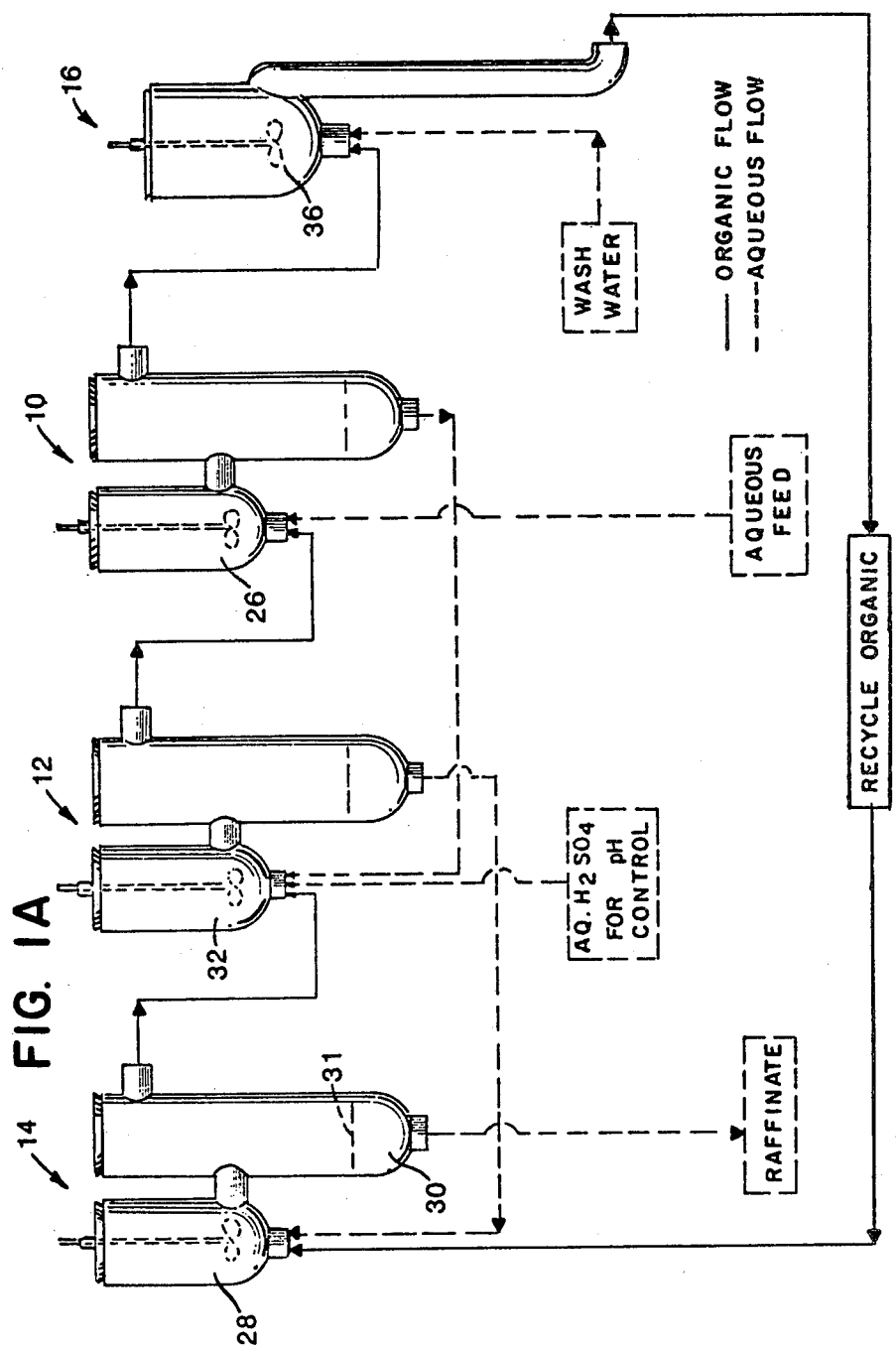
FIG. IA

RECOVERY OF TUNGSTEN VALUES FROM ALKALI TUNGSTATE SOLUTIONS BY SOLVENT EXTRACTION

BACKGROUND OF INVENTION

This invention relates to the recovery of tungsten values from aqueous alkali metal tungstate solutions by liquid-liquid solvent-extraction process. More particularly, the invention relates to the extraction of tungsten values by an organic mixture and subsequent recovery of an ammonium tungstate solution by stripping.

Prior art processes relating to recovery of tungsten include U.S. Pat. Nos. 3,158,438 to Kurtak; 3,256,058 to Burwell; and 3,293,004 to Musgrove et al; South African Pat. No. 684,892 and British Pat. No. 1,240,524. U.S. Pat. No. 4,175,109 to Kim relates to a tungsten extraction process.

It is an object of the present invention to provide an improved process for recovery of tungsten values from aqueous alkali metal tungstate solutions.

Other and further objects will become apparent from reading the following description.

SUMMARY

In accordance with the present invention, there is provided a process for producing ammonium tungstate from an aqueous alkali metal tungstate solution comprising the steps of: (a) extracting tungsten values into an organic extractant by contacting said aqueous alkali metal tungstate solution with said organic extractant for a sufficient period of time to form a loaded organic extractant containing tungsten values and an aqueous solution, said organic extractant comprising a high molecular weight alkyl amine and an organic solvent, (b) separating said loaded organic extractant from said aqueous solution, (c) stripping said loaded organic extractant from step (b) by contacting with an aqueous ammonia solution to form an aqueous ammonium tungstate solution and a stripped organic extractant, said aqueous ammonia solution consisting essentially of water and from about 5 to about 21 percent by weight ammonium hydroxide at a pH of from about 12 to about 13, said contacting being carried out by dispersing said aqueous ammonia solution in said organic extractant wherein said organic extractant forms a continuous phase with said aqueous ammonia solution being dispersed therein as a discontinuous aqueous phase, (d) separating said aqueous ammonium tungstate from said stripped organic extractant; and (e) feeding said stripped organic extractant to step (a) for use as said organic extractant.

DRAWINGS

FIGS. 1-A and 1-B illustrate schematically a series of mixer-settler units that can be subdivided into an extraction circuit and a stripping circuit. The extraction circuit comprises three units or stages: a first stage 10, a second stage 12, a third stage 14, and a wash or scrub stage 16. The stripping circuit comprises or consists of a stripping column-contactor 18, followed by a mixer-settler 20, a wash stage 22, and organic regeneration stage 24.

DETAILED DESCRIPTION

Figure 1B:
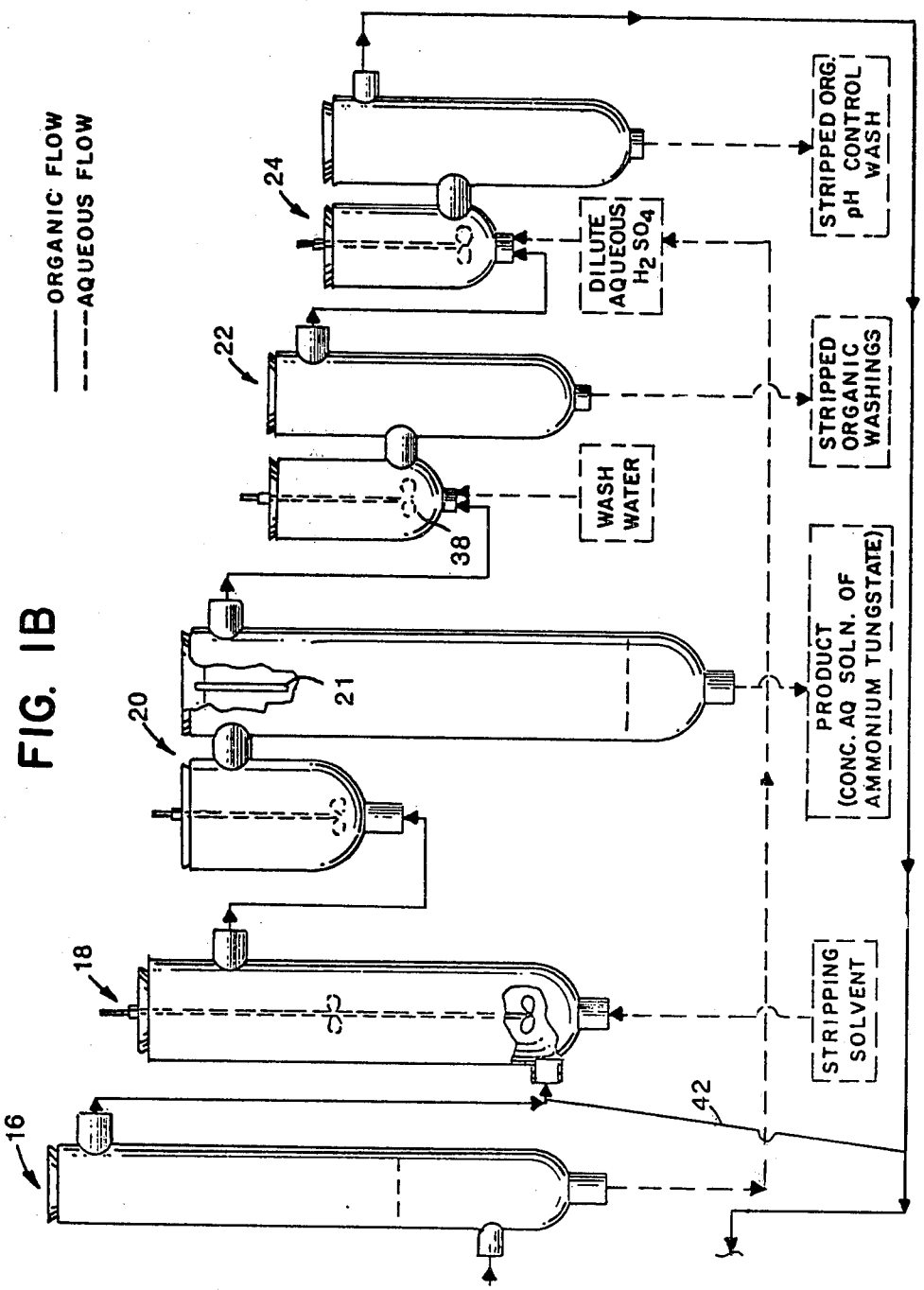

The organic extractant utilized in the process of the present invention comprises an active extractant comprised of a high-molecular weight alkyl amine and a solvent consisting of a liquid hydrocarbon.

The amine extractant is preferably either secondary or tertiary containing aliphatic hydrocarbon groups from 8 to 22 carbon atoms the most preferred amine extractant is a tertiary amine, tricaprylamine (e.g., Alamine 336 produced by General Mills, Inc. or Adogen 364 produced by Archer Daniels-Midland, Inc.). The amine extractant should be only sparingly soluble in water and be capable of forming tungstate amine complexes which are soluble in the organic phase. Typical suitable amines are triamylamine, triisooctylamine, triisodecylamine, didecylamine, and di(tridecyl)amine.

The organic extractant typically includes a phase conditioner. Phosphate esters are typical phase conditioners or modifiers and serve to minimize or prevent emulsion and third phase formation. Tri-(hydro carbyl)-phosphates wherein the ether radical is a hydrocarbon radical are preferred. The trialkyl phosphates are preferable with the tributyl and triamyl phosphates being most preferred. Other typical phase conditioners include high molecular weight alcohols such as isododecanol.

The solvent is preferably a water insoluble liquid hydrocarbon predominantly aliphatic in nature prepared from crude oil by fractionation. By water insoluble; it is meant that less than 5 grams of the hydrocarbon dissolves in 1000 cc. of water at 25° C. Preferably the solvent is aliphatic hydrocarbon or kerosene type liquid hydrocarbon. The kerosene preferably has a minimum flash point of 120° F. and more preferably greater than about 135° F. The most preferred solvent is Kermac 470W which is an aliphatic kerosene type petroleum distallate. Kermac 470W which is commercially available from Kerr-McGee Co. has a higher flash point and narrower boiling range as compared to kerosene. The TCC flash point is 175° F. with a specific gravity 60/60° F. of 0.8109.

The preferred ratio of amine extractant to solubilizer to solvent is within the volume range of from about 1:0.5:8.5 to about 2:1.2:6.8 and preferably within the volume range of 1:0.5:8.5 to about 1:2:7. The most preferred volume ratio is 1:1.2:7.8.

In the extraction circuit aqueous alkali metal tungstate solution, preferably sodium tungstate solution, is adjusted to a pH of about 1.8 to about 3.0, preferably a pH of about 1.8 to about 2.3. The feed tungstate solution which preferably has a concentration of $WO_3$/liter of from about 100 to about 200 grams and more preferable of from about 150 to about 180 grams, is fed to mixing compartment 26 of the first extraction stage 10 and then to mixing compartment 32 of second stage 12. At the same time barren or unloaded extractant is fed to the mixing compartment 28 of the third extraction stage 14 and flows countercurrently to the aqueous feed flow, i.e., from stage 14 to stage 10, while progressively extracting and loading tungstate at each stage until it reaches a maximum or other desirable loading at stage 10.

The aqueous feed solution while traveling countercurrently to the organic extractant from stages 10, 12, and 14, as is illustrated in FIG. 1-A, becomes progressively depleted of tungsten values. Substantially fully depleted tungstate solution or raffinate is discharged from the settling section 30 of stage 14, and typically has a pH of from about 1.2 to about 2.0, preferably from about 1.4 to about 1.7; a specific gravity of from about 1.07 to about 1.09 and contains less than about 0.1 grams of WO₃ per liter. The approximate point where separation between the aqueous and organic phases occurs is shown by the broken line 31 of the settling section 30 of stage 14. Similar broken lines indicate the approximate point where phase separation occurs in settling sections of other units or stages in the system.

The loaded organic extractant from the settling section 34 of stage 10 is fed to the mixing section 36 of the wash or scrub stage 16 where it is washed with water, preferably deionized water, to reduce the amount of entrained water insoluble impurities, e.g. sodium sulfate. The settling section of the scrub stage is shown in FIG. 1-B.

In the stripping circuit the scrubbed, loaded organic solution flows to a point near the bottom of the columnar contactor-stripper 18 wherein it is contacted, under controlled agitation, with stripping solution that passes upwardly through the column in co-current flow.

The stripped organic solvent from the mixer-settler unit 20, which is provided with a baffle 21 in the upper part of the settling section where indicated in FIG. 1-B, flows to a wash stage 22 wherein it is scrubbed free of entrained ammonium tungstate. Scrub water, preferably deionized water is fed to the mixing compartment 38 of the wash stage 22.

In the final or organic-resistant regeneration stage 24, the stripped and washed organic extractant is regenerated or reconstituted for recycling to the third stage 14 of the extraction circuit by contact with a dilute aqueous solution of sulfuric acid. The regeneration of the organic extractant involves conversion of the amine component thereof to the sulfate or bisulfate form. The extraction of tungsten values by the amine extractant occurs by a mechanism that involves the exchange of the sulfate or bisulfate ion for the tungstate ion.

The extracting and stripping operations are carried out within a temperature range of from about 30° C. to about 60° C. and preferably from about 40° C. to about 50° C.

The alkali tungstate feed solution may be prepared by any of the previously known procedures including caustic digestion of ore concentrates, fusion of ore concentrates, treatment of leach liquors to remove molybdenum and/or other impurities, and by other known techniques. Wolframite-ore concentrates processed by caustic digestion are preferred sources of tungsten values in order to obtain highly concentrated alkali metal tungstate solutions directly.

The stripping solution comprises from about 5 to about 21 percent by weight ammonia at a pH of from about 12 to about 13. The stripping solution consists essentially of water and ammonium hydroxide. Preferably, impurities such as other cations and anions are present in an amount less that 3 percent by weight, and more preferably less than 1 percent tungstate ion is preferably present in an amount less than one percent. More preferably the weight percent of ammonia is from about 6 to about 10 and the pH is about 12. The above mentioned weight percents are weight percent based on total weight of the stripping solution and total weight of ammonia in the solution.

The scrubbed, loaded organic extractant is contacted with the stripping solution in contactor 18. Preferably a single stage stripper is utilized in accordance with the process of the present invention to achieve a quantitative stripping of tungsten values. The loaded organic extractant and stripping solution travel in co-current flow through the contactor. The dispersing of aqueous ammonia solution in the loaded organic extractant is carried out to provide an organic continuous phase. The ratio of organic extractant to the aqueous stripping solution based on weight is preferably from about 7.0 to one to about 3.5 to one and more preferably from about 5.0 to one to about 4.2 to one. The contactor is operated with an excess organic phase over aqueous phase. To maintain this ratio, a proportion of the already stripped organic may be conveniently recycled through the contactor as illustrated by conduit 42 in FIG. 1B.

The contactor 18 is preferably operated so as to maintain the organic phase as a continuous phase with the aqueous phase dispersed therein. The aqueous phase is dispersed to such an extent that settling results in the separation of the phases. The dispersion should not result in the formation of an emulsion. As illustrated in the drawing, the loaded organic extractant and the stripping solution are contacted in co-current flow.

A preferred method for determining whether the organic phase is continuous is by measuring the conductivity of the fluid in the contactor 18. If the fluid is non-conductive as determined by test, the organic phase is continuous. If the fluid is conductive as determined by test, the aqueous phase is continuous. The conductivity may be conveniently tested by immersing a pair of electrodes connected to a voltage source into the contactor 18. If during operation, voltage registers on a voltage meter, the operator knows that the aqueous phase has become continuous. In this case, the aqueous phase should be removed from the contactor and contactor filled with organic phase. The operation may be resumed by operating under the preferred conditions hereinbefore discussed.

The positioning of the lower agitator blades in the columnar-contactor 18, which should be a closed vessel, is important. As illustrated in FIG. 1-B, the lower blades should be placed just above the horizontal plane across the column at a point corresponding to the top of the slide inlet for the loaded organic extractant. The location of the upper blades with respect to the distance from the top and bottom of the vessel is not critical other than that they should be so located that the upwardly flowing, agitated mixture of stripping agent and loaded organic extractant is substantially uniform; otherwise, an emulsion or a phase separation may occur. Both the upper and lower blades are attached to a shaft. The r.p.m. is adjusted so that the admixed stripping agent and loaded organic extractant flow upwardly as a mass with the aqueous dispersed in the organic phase.

In the contactor 18, the ratio of the length (L) to the diameter (D) of the stripping column-contactor 18 should have a value for L with respect to D sufficiently high so that adequate contact takes place between the aqueous stripping agent and the loaded organic extractant.

Extraction units other than mixer settlers may be employed without affecting the operation of the contactor-stripper 18. Examples of such other types of extraction units are centrifugal devices, multistage columns of various types including unpacked columns, packed columns, pulse-type columns and others.

With starting concentrations in the aqueous feed and in the loaded organic as hereinbefore described, the desired product which exits from mixer settler 20 is an aqueous solution of ammonium tungstate comprising from about 200 to about 300 grams of WO₃ per liter. Substantially all of the tungsten values are recovered as ammonium tungstate after passing through units 18 and 20.

The mixer settler 20 is provided for additional agitation and settling for separation of the organic and aqueous phases. Mixed stripped organic extractant may be fed directly to a settling unit with proper sizing of the column stripping unit.

EXAMPLE I

The stripping circuit as described in the drawings is carried out on a small scale. For each of the units 20, 22, and 24, the mixing section holds about 50 milliliters and the settling section holds about 150 milliliters of liquid. The stripping solution was 9.5 percent by weight ammonia at a pH of 11.7 prepared by diluting a concentrated ammonium hydroxide, 30.6 percent by weight ammonia, obtained by steam stripping dilute ammonia solutions. The loaded organic consisted of 10 percent by volume Alamine 336, 12 percent tributylphosphate, 78 percent by volume kerosene which was contacted with 1.5 N sulfuric acid to make the amine salt prior to loading by contacting with sodium tungstate solution. The small scale stripping circuit was operated for 20 hours by feeding the aqueous solution at the rate of 42 milliliters per minute. The organic to aqueous ratio is at 4.2 to 1 in the contactor and the organic phase was maintained as continuous. The stripped organic solution is recycled at the ratio of 6.5 milliliters per minute. The product ammonium tungstate concentration was measured every hour. After four hours the concentration was 287.3 grams of $WO_3$/liter, after 10 hours the concentration was 298.6 grams of $WO_3$/liter, at 13 hours, 15 and 18 hours the respective concentrations were 303.7; 312.5; and 332.6.

While there has been shown and described what are considered preferred embodiments of the present invention, it will be obvious to those skilled in the art that various changes and modifications may be made therein without departing from the scope of the invention as described in the appended claims.

We claim:

1. A process for producing ammonium tungstate from an aqueous alkali metal tungstate solution containing impurities comprising the steps of: (a) extracting said tungsten values into an organic extractant by contacting said aqueous alkali metal tungstate solution with said organic extractant for a sufficient period of time to form a loaded organic extractant containing tungsten values and and an aqueous solution containing a portion of said impurities, said organic extractant comprising tricaprylamine as an active extractant, a trialkyl phosphate as a modifier, and kerosene as an organic solvent, (b) separating said loaded organic extractant from said aqueous solution, (c) stripping said loaded organic extractant from step (b) by contacting with an aqueous ammonia solution at a volume ratio of said aqueous ammonia solution to said loaded organic extractant of from about 7 to one to about 3.5 to one to form an aqueous ammonium tungstate solution and a stripped organic extractant, said aqueous ammonia solution consisting essentially of water and from about 5 to about 21 percent by weight ammonia at a pH of from about 12 to about 13, said contacting being carried out by dispersing said aqueous ammonia solution in said loaded organic wherein said extractant forms a continuous phase with said aqueous ammonia solution dispersed therein as a discontinuous aqueous phase, (d) separating said aqueous ammonium tungstate from said stripped organic extractant; and feeding one portion of said stripped organic extractant to step (a) for use as said organic extractant and feeding another portion of said stripped organic extractant to step (c) for use as organic phase for maintaining said volume ratio.

2. A process for producing ammonium tungstate from an aqueous alkali metal tungstate solution according to claim 1 wherein said volume ratio is from about 5.0 to one to about 4.2 to one.

* * * * *

UNITED STATES PATENT AND TRADEMARK OFFICE
CERTIFICATE OF CORRECTION

PATENT NO. : 4,369,165

DATED : January 18, 1983

INVENTOR(S) : Kim et al

It is certified that error appears in the above—identified patent and that said Letters Patent is hereby corrected as shown below:

Column 4, line 4, replace "weight" with --volume--;
Claim 1, column 6, line 20, replace "7 to one" with --one to 7--;
Claim 1, column 6, line 20, replace "3.5 to one" with --one to 3.5--;
Claim 2, column 6, line 38 to 39, replace "5.0 to one" with --one to 5.0--;
Claim 2, column 6, line 39, replace "4.2 to one" with --one to 4.2--.

Signed and Sealed this

Second Day of May, 1989

Attest:

DONALD J. QUIGG

Attesting Officer

Commissioner of Patents and Trademarks